No. 774,088. PATENTED NOV. 1, 1904.
D. R. LEIGHTON.
AUTOMATIC FLUID PIPE CONNECTION FOR RAILWAY CARS.
APPLICATION FILED FEB. 27, 1904.
NO MODEL. 2 SHEETS—SHEET 1.
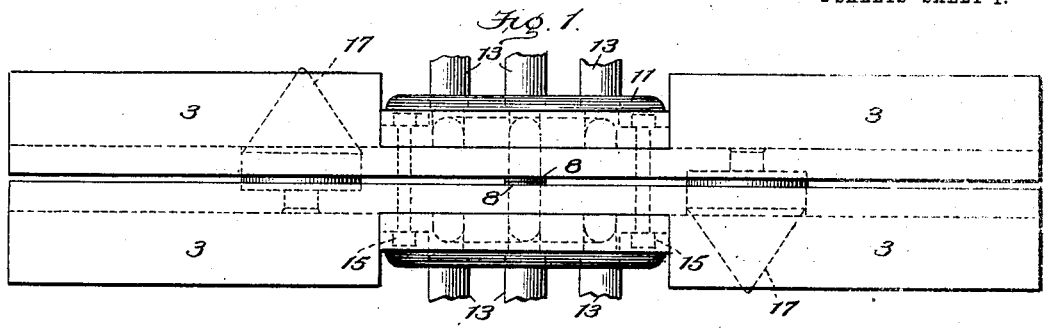
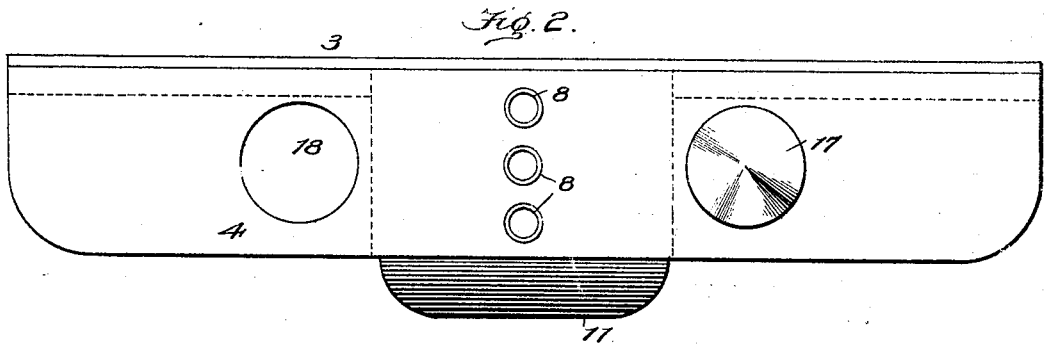
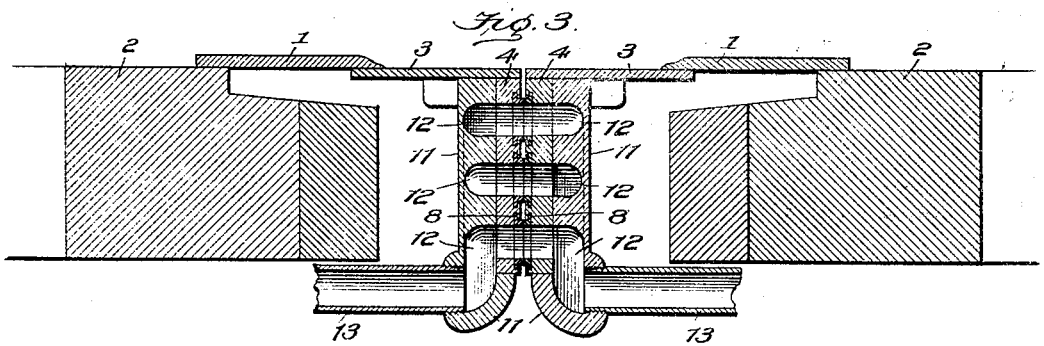
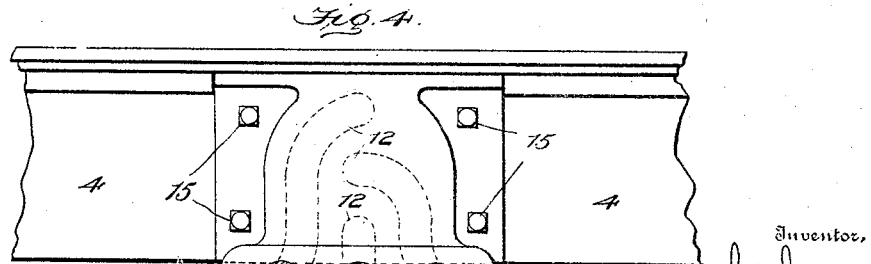

No. 774,088. PATENTED NOV. 1, 1904.
D. R. LEIGHTON.
AUTOMATIC FLUID PIPE CONNECTION FOR RAILWAY CARS.
APPLICATION FILED FEB. 27, 1904.
NO MODEL. 2 SHEETS—SHEET 2.
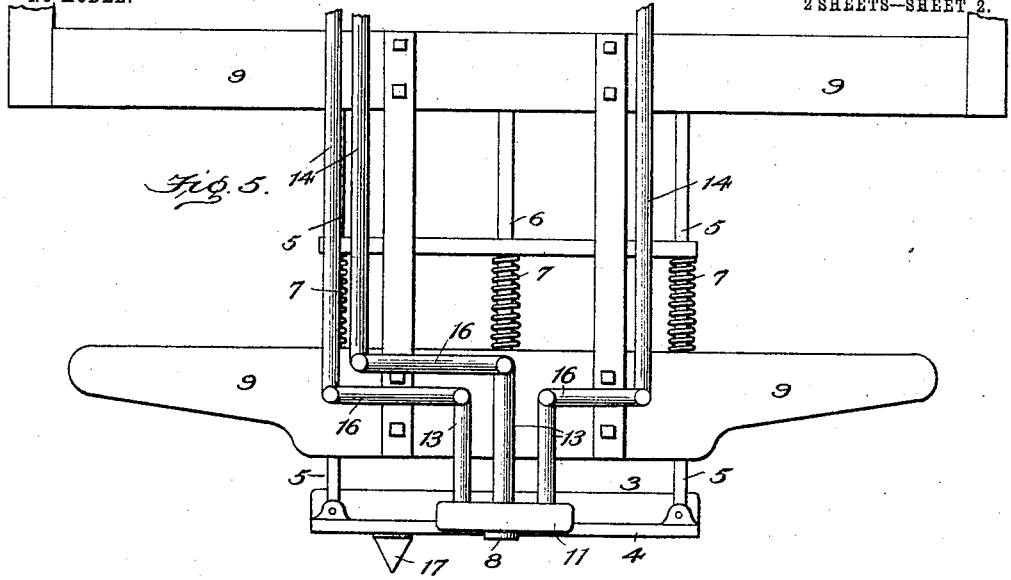
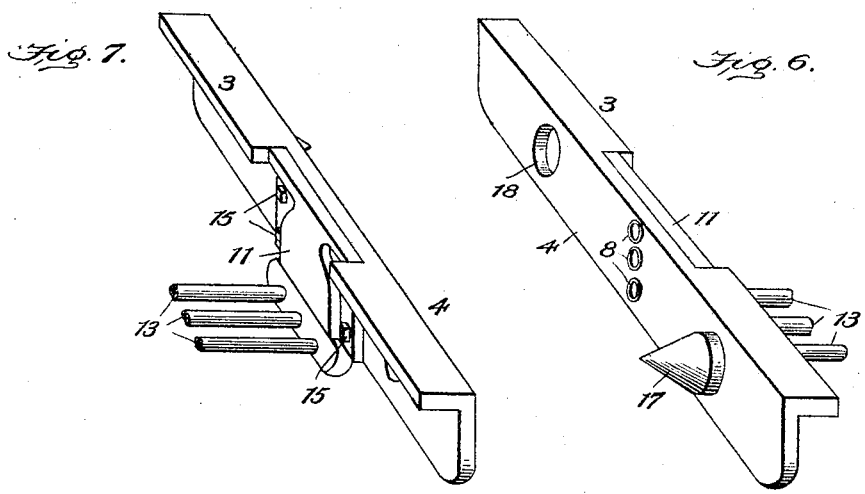
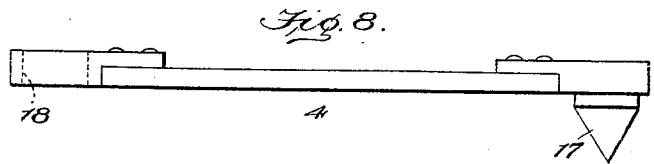
Witnesses
Edwin L. Bradford
Thomas Hood Yeager
Inventor
Dominicus R. Leighton
By Johnson & Johnson
Attorneys No. 774,088.

Patented November 1, 1904.

UNITED STATES PATENT OFFICE.

DOMINICUS R. LEIGHTON, OF NEW HAVEN, CONNECTICUT, ASSIGNOR OF ONE-HALF TO FREDERIC L. LEIGHTON, OF NEW HAVEN, CONNECTICUT.

AUTOMATIC FLUID-PIPE CONNECTION FOR RAILWAY-CARS.

SPECIFICATION forming part of Letters Patent No. 774,088, dated November 1, 1904.

Application filed February 27, 1904. Serial No. 195,581. (No model.)

*To all whom it may concern:*

Be it known that I, DOMINICUS RUMERY LEIGHTON, a citizen of the United States, residing at New Haven, in the county of New Haven and State of Connecticut, have invented certain new and useful Improvements in Automatic Fluid-Pipe Connections for Railway-Cars; and I do hereby declare the following to be a full, clear, and exact description of the invention, such as will enable others skilled in the art to which it appertains to make and use the same.

So far as I know and can find I am the first to provide means carried by the car buffer-bars to automatically couple the train air-brake pipes at the meeting faces of the buffer-bars in connecting the cars, and my invention resides in carrying the coupling ends of the train fluid-pipes by the car buffer-bars, whereby the pipes are caused to be automatically connected at the meeting faces of the buffers.

The object of my invention is to avoid the separate automatic fluid-pipe couplings arranged beneath the means for coupling the cars and to use the slidable platforms of the cars both as the buffers and the means of automatically coupling the air-brake pipes, and for this purpose my invention comprehends provision whereby the fixed fluid train-pipes are flexibly connected with the slidable-platform buffer-bars, so that the movements of the buffer-bars under the bumping of the cars together will cause that part of the air-brake pipe carried with the buffer-bar to flex at its connection with the fixed part of the air-pipe.

My invention is complete with a single air-brake train-pipe; but the number of train-pipes may be suited to the character of the car—as, for instance, a pipe for the air-brake, a pipe for the signal, and a pipe for steam-heating. When a plurality of such pipes are used, the openings in the buffer-bar for the coupling ends of the pipes are arranged in vertical alinement. In such disposition a cast backing-plate for the bar is advantageous in affording a firm and convenient mounting for the flexible connection for the fluid car-pipes and for forming ducts or passages therein connecting the coupling ends of the train-pipes.

The following description, read in connection with the accompanying drawings, will enable any one skilled in the art to which my invention relates to understand its nature and to practice it in the form in which I prefer to use it; but it will be understood that my invention is not limited to the precise form and details of construction herein illustrated and described, as various modifications and changes may be made without exceeding the scope of the claims in which my invention is set out.

Referring to the drawings, Figure 1 shows in top view the slidable platforms which constitute the buffer-bars in the positions they occupy when the cars are connected and how the automatic coupling of the ends of the fluid-tube is effected through and by means of the platform buffer-bars as the feature which constitutes my invention. Fig. 2 is a front view of the buffer-bar of the slidable platform, showing the coupling ends of the fluid-tubes opening at the face of the buffer-bar. Fig. 3 is a vertical section showing the slidable-platform buffer-bars as carrying the coupling ends of the fluid-tubes of the connected cars and the manner of effecting the automatic coupling of the fluid-tubes by their abutting open ends at the meeting faces of the platform buffer-bars. Fig. 4 shows an inner side view of a casting secured to the inner side of the platform buffer-bar and within which ducts or passages are shown by dotted lines, with which the car fluid-pipes connect and which terminate in nippled openings at the meeting faces of the buffer-bars. Fig. 5 is a view of the under side of the slidable-platform buffer-bar, showing the connection therewith of the fluid-tubes and the jointed connections of the latter with train-pipes. Fig. 6 shows in perspective the front face of the slidable-platform buffer-bar and the nippled open ends of the fluid-tubes. Fig. 7 shows an inner side view of the slidable-platform buffer-bar and the casting to which the train fluid-tubes are connected and which open at the front face of the buffer-bar for the automatic coupling of the fluid-tubes. Fig. 8 shows a construction for lengthening the buffer-bar.

I have shown only so much of the frame of a car as shows the relation thereto of the slidable buffer platform-bar, which by my invention is made the means of supporting and carrying the ends of the train fluid-tubes and of effecting their automatic coupling at the meeting faces of the buffer-bars in the operation of connecting the cars.

In Fig. 3 is shown the stationary car-platform 1 and the cross-sill 2, which connects the longitudinal timbers of the car. The slidable platform 3 is carried by the buffer-bar 4, which is suitably mounted to slide with the platform and is provided with any suitable arrangement and construction of stay-rods 5 5 and 6, each having a coil-spring 7, the function of which is to receive the concussion of the buffer-bar and to press the bars out to maintain the abutting relation of the open ends 8 of the fluid train-tubes at the meeting faces of the buffer-bars when the cars are connected.

The stay and guide rods are slidable in the cross-timbers 9, which connect the longitudinal timbers, and the springs 7 on these rods are so mounted as to yieldingly hold the slidable buffer-bar in its projected position and which when the cars are connected will force the meeting faces of the slidable-platform buffer-bars so close together as to maintain the open nippled ends 8 of the fluid-tubes in contact under pressure, and therefore automatically couple them in the coupling of the cars. This automatic coupling of the fluid train tubes or pipes is effected in the following manner at the meeting faces of the platform buffer-bars and by means under the sole control of the car-buffers, as I will now describe: The buffer-bar 4, which carries the slidable platform 3, has openings in vertical alinement at a point about mediately of its length, into which openings are secured rubber nipples 8, which project slightly beyond the face of the buffer-bar, with a circular projecting edge which receives the impact of like nipples carried by the buffer-bar of the car which is being connected. The nipples being firmly seated and countersunk in the walls of the openings resist the compression caused by the pressure of the automatic coupling of the fluid pipe or pipes, and when coupled the nipples are under constant spring pressure and engagement.

At the inner side of the buffer-bar is secured a casting 11, having interior passages or ducts 12, which open at both its faces and register with the openings in the buffer-bar. The train fluid-tubes 13 are screwed or suitably coupled with the openings at the back or inner side of the casting, so that when the cars are connected the coupling of the fluid-tubes is effected at the meeting faces of the platform buffer-bars, and the connection of the train-tubes 14 is thereby rendered continuous through the train buffer-bars and their castings. As the nippled openings are in vertical alinement in the face of the buffer-bar, and the fluid train-tubes 13 are arranged in a horizontal parallel group, the passages or ducts which connect the two upper nippled openings are curved or turned outward over the lower passage or duct, so as to connect with the outside fluid-tubes at the base of the casting, which for this purpose is enlarged, as shown by dotted lines in Fig. 4 and in full lines in Fig. 3, where the enlarged part of the casting is seen as joining the under edge of the buffer-bar.

I prefer to construct the train-tube casting with the passages or ducts registering with the openings in the buffer-bar; but obviously the casting may be formed with nipples adapted to be inserted into the openings in the back of the buffer-bar; but of whatever construction, the joining of the casting and the joining of the rubber nipples with the buffer-bar must be air-tight. In Figs. 1 and 4 the casting is seen as secured to the buffer-bar by screw-bolts 15, suitably disposed.

As the buffer-bars are mounted to yield under the buffer action in coupling the cars, I have shown in Fig. 5 means for flexibly joining the train-tubes, whereby they are caused to be flexed. Short tubes 13, which connect the rear side of the casting, are jointed to short tubes 16, which stand at right angles and are jointed to the train-tubes 14, which are fixed so that the short jointed sections 13 are free to flex with the movement of the car buffer-bar; but obviously other flexible connection may be used.

It will be understood that each end of the car is equipped with the slidable-platform buffer-bar which is provided with the nipples or gaskets the construction of which adapts them to make free and automatic connection of the train fluid-tubes. The contacting faces of the nipples are preferably flat and when in contact under pressure render the joining air-tight, with free communication between the fluid-tube systems of the connected cars, and while this connection is made by and through the train car-buffers without fastenings of the joined nipples or gaskets they are rendered separable by merely uncoupling the cars. I have shown three tubes, one of which may be for actuating the air-brakes, one for actuating the signal, and one for steam, and to insure the proper meeting of the flat ends of the buffer-bar nipples and to prevent any lateral movement one upon the other conical projections 17 are provided on the face of the buffer-bars, which engage corresponding recesses 18, there being one or more such projections on one buffer-bar and a corresponding recess in the meeting face of the other buffer-bar, and these will be arranged to suit those now in use.

It will be understood that in using the train-platform buffer-bars as the means for carrying the coupling ends and for effecting the automatic connection of the train fluid-tubes I save the cost of equipping the cars with separate air-brake coupling mechanism mounted on the car-frame below the means for coupling the cars.

In Fig. 8 I have shown the short buffer-bar provided with extension ends to increase its length to adapt the guide-cones to register outside the length of the regular short buffer-bar in using my invention with cars now in use.

I claim—

1. In an automatic fluid-pipe connection for railway-cars, a slidable spring-pressed buffer-bar forming a part of the car-platform and having fixed thereto the coupling ends of the fluid-pipe connections at the meeting faces of the buffer-bars for automatic coupling through said buffer-bars.

2. In an automatic fluid-pipe connection for railway-cars, a slidable and spring-pressed platform buffer-bar having an opening mediately of its length, a rubber nipple or gasket within said opening projecting from the face of the bar, a fluid-pipe connected to the opening at the inner side of the bar and flexible connections for said pipe with the fixed fluid-pipe of the car, for the purpose stated.

3. In an automatic fluid-pipe connection for railway-cars, slidable and spring-pressed platform buffer-bars having each an opening mediately of its length, a fluid-pipe connected to said opening at the inner side of the buffer-bar, flexible connections for said pipe with the fixed fluid-pipe of the car and means whereby the said buffer-bar opening is caused to automatically effect a connection with the train fluid-pipe of the connected car.

4. In an automatic fluid-pipe connection for railway-cars a slidable spring-pressed platform buffer-bar having an opening mediately of its length, a rubber nipple or gasket within said opening projecting from the face of the bar, a casting on the inner side of the bar having a passage or duct registering with the opening in the bar, a fluid-pipe connected to the passage or duct at the inner side of the casting, and flexible connections for said pipe with the fixed pipe of the car.

5. In an automatic fluid-pipe connection for railway-cars, slidable spring-pressed platform buffer-bars each having an opening, the coupling ends of the train fluid-pipes carried in said openings and flexible connections for said pipe-coupling ends and the fixed car-pipes.

6. In an automatic fluid-pipe connection for railway-cars, a slidable spring-pressed platform buffer-bar carrying the coupling ends of the fluid-pipe connections at its front face for automatic coupling, the said pipe connections being in vertical alinement of said front face and in horizontal alinement at the rear or inner side of the buffer-bar.

In testimony whereof I have signed my name to this specification in the presence of two subscribing witnesses.

DOMINICUS R. LEIGHTON.

Witnesses:
F. V. DANFORTH,
CLARENCE W. BRONSON.